(12) United States Patent
McElroy et al.

(10) Patent No.: US 10,744,915 B2
(45) Date of Patent: Aug. 18, 2020

(54) VENTILATED SEAT

(71) Applicant: Ford Global Technologies, LLC, Dearborn, MI (US)

(72) Inventors: Michael Murphy McElroy, South Lyon, MI (US); Jeffrey Michael Attala, Lasalle (CA); Ahmad Miqdadi, Ann Arbor, MI (US); Ryan Kurrle, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 16/168,278

(22) Filed: Oct. 23, 2018

(65) Prior Publication Data
US 2020/0122613 A1 Apr. 23, 2020

(51) Int. Cl.
*B60N 2/56* (2006.01)

(52) U.S. Cl.
CPC ........... *B60N 2/565* (2013.01); *B60N 2/5642* (2013.01)

(58) Field of Classification Search
CPC .... B60N 2/565; B60N 2/5642; B60N 2/5621; B60N 2/5607; B60N 2/56; A47C 7/62; A47C 7/72; A47C 7/74; A47C 7/742; A47C 7/744
USPC ............................ 297/180.14, 180.13, 180.1
See application file for complete search history.

(56) References Cited

U.S. PATENT DOCUMENTS

| | | | |
|---|---|---|---|
| 7,506,924 B2 | 3/2009 | Bargheer et al. | |
| 10,500,994 B1 * | 12/2019 | Dry | H01L 35/30 |
| 2002/0011071 A1 * | 1/2002 | Needham | B60H 1/00285 62/3.2 |
| 2002/0041116 A1 * | 4/2002 | Bogisch | B60J 7/223 297/180.1 |
| 2007/0029862 A1 * | 2/2007 | Bargheer | B60N 2/5621 297/452.42 |
| 2007/0101729 A1 | 5/2007 | Aoki et al. | |
| 2007/0278835 A1 * | 12/2007 | Bargheer | A47C 7/74 297/180.12 |
| 2008/0290703 A1 | 11/2008 | Bargheer et al. | |
| 2011/0187165 A1 * | 8/2011 | Oota | B60N 2/5671 297/180.14 |
| 2012/0080911 A1 * | 4/2012 | Brykalski | A47C 7/744 297/180.15 |
| 2014/0179212 A1 * | 6/2014 | Space | B60N 2/565 454/76 |
| 2015/0140915 A1 * | 5/2015 | Rawlinson | B60N 2/5621 454/120 |
| 2016/0272038 A1 * | 9/2016 | Tanaka | B60H 1/00285 |
| 2016/0347218 A1 | 12/2016 | Akaike et al. | |
| 2019/0143859 A1 * | 5/2019 | Sakoda | B60N 2/90 297/218.1 |

FOREIGN PATENT DOCUMENTS

| | | |
|---|---|---|
| DE | 102005035113 B4 | 7/2008 |
| JP | 2017178273 A | 10/2017 |

* cited by examiner

*Primary Examiner* — Mark R Wendell
(74) *Attorney, Agent, or Firm* — David Coppiellie; Price Heneveld LLP

(57) ABSTRACT

A vehicle seat includes an air mover within a seatback. An inlet channel extends from an occupant seatback surface to the air mover and includes first and second outlet channels. The air mover selectively and alternatively moves air from the inlet channel to one of the first and second outlet channels. The first outlet channel includes a vent located proximate a headrest.

20 Claims, 12 Drawing Sheets

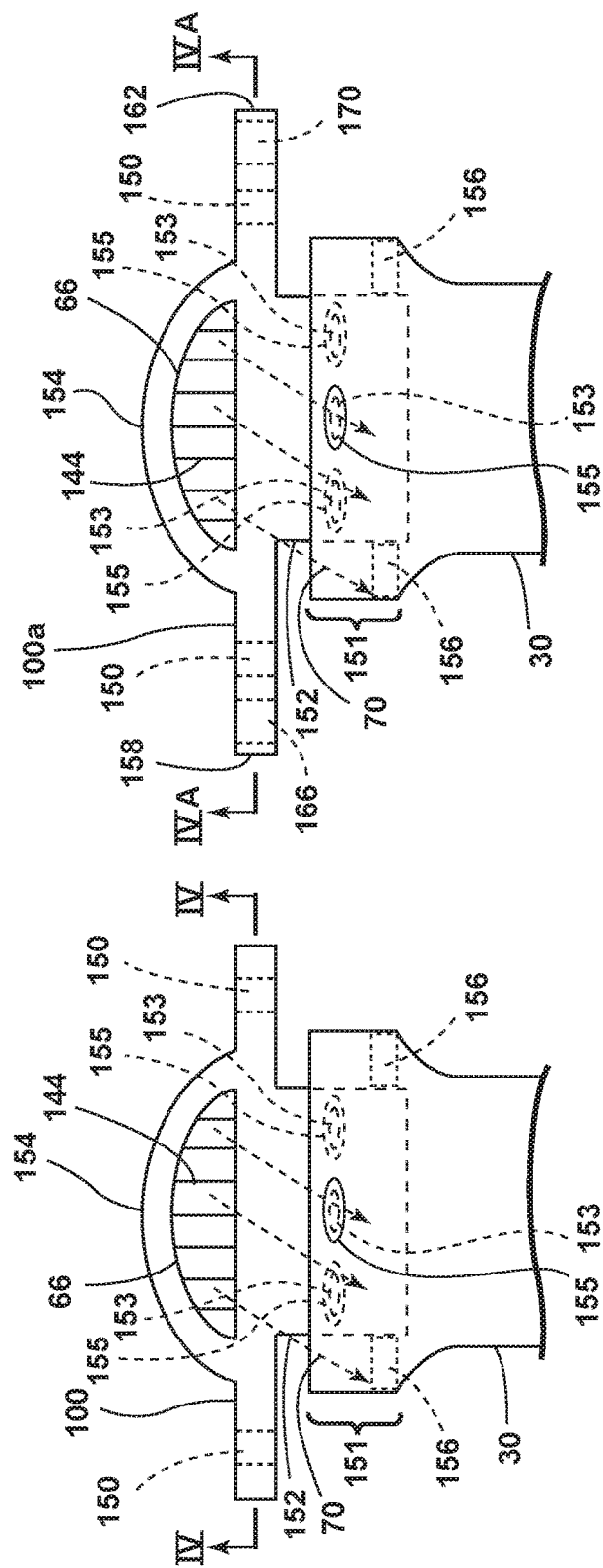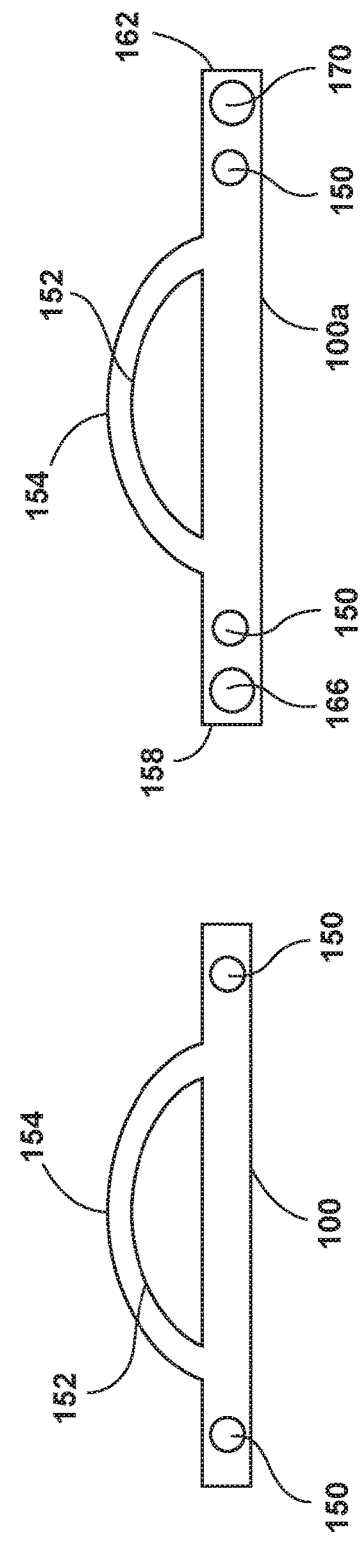
FIG. 3   FIG. 3A
FIG. 4   FIG. 4A

US 10,744,915 B2

VENTILATED SEAT

FIELD OF THE DISCLOSURE

The present disclosure generally relates to a vehicle seating assembly, and more particularly to a vehicle seating assembly with ventilation.

BACKGROUND OF THE DISCLOSURE

Vehicle seat comfort has become increasingly important as passengers take longer trips. Providing ventilation in the seating assembly can increase the comfort of passengers. A variety of vehicle seating assemblies that provide for ventilated cooling of an occupant are known. However, current solutions for providing cooling airflow often can be too bulky to conform to the seats for which they are intended while still efficiently ventilating the seats. It is desirable to provide a seating assembly that provides ventilated cooling to multiple seat areas.

SUMMARY OF THE DISCLOSURE

According to a first aspect of the present disclosure, a vehicle seat includes an air mover within a seatback. An inlet channel extends from an occupant seatback surface to the air mover and includes first and second outlet channels. The air mover selectively and alternatively moves air from the inlet channel to one of the first and second outlet channels. The first outlet channel includes a vent located proximate a headrest.

Embodiments of the first aspect of the disclosure can include any one or a combination of the following features:
 the vent is centrally disposed on the top of the seatback and between the top of the seatback and the headrest and wherein the first outlet channel extends from the air mover to the vent;
 the first outlet channel is centrally disposed in the seatback;
 a bezel disposed in the top of the seatback, wherein the bezel houses the vent;
 the bezel comprises one or more apertures for receiving the headrest;
 the one or more apertures comprise first and second apertures disposed on respective first and second sides of the vent;
 the vent is selectively positionable in an open position, a closed position, and a plurality of positions between the open position and the closed position;
 the inlet channel comprises a plurality of tubes extending from the occupant seatback surface to the air mover;
 the first outlet channel is selectively operable to exhaust air to the vent and the second outlet channel is selectively operable to exhaust air into a seatback interior;
 a first outlet airflow adjuster for selectively blocking airflow from the air mover to the first outlet channel;
 a second outlet airflow adjuster for selectively blocking airflow from the air mover to the second outlet channel; and
 an auxiliary inlet channel, wherein the auxiliary inlet channel extends from a seatback bottom portion to the air mover, and wherein the inlet channel and the auxiliary inlet channel are selectively and alternatively operable to deliver air to the air mover.

According to a second aspect of the present disclosure, a ventilation system for a vehicle seat includes a vent retained in a bezel. An inlet channel delivers air from a seating surface to an air mover. A first outlet channel delivers air from the air mover to the vent. A second outlet channel delivers air from the air mover to a seatback interior. The bezel is centrally disposed at a top of a seatback.

Embodiments of the second aspect of the disclosure can include any one or a combination of the following features:
 a headrest, wherein the headrest is attached to the seatback and wherein the bezel is disposed between an upper portion of the seatback and the headrest;
 the headrest comprises a first rod and a second rod that extend into the upper portion of the seatback and wherein the bezel is disposed between the first rod and the second rod;
 the vent is selectively positionable to direct air towards at least one of an occupant facing portion of the seatback and an occupant facing portion of the headrest;
 the headrest comprises an extension member that extends through the bezel and into the upper portion of the seatback; and
 the extension member comprises a first rod and a second rod and wherein the vent is disposed between the first rod and the second rod.

According to a third aspect of the present disclosure, a ventilation system for a vehicle seating assembly includes a seatback having an occupant supporting surface, an upward facing surface, and an air mover. An inlet channel moves air from the occupant supporting surface to the air mover. A first outlet channel moves air from the air mover to a vent disposed on the upward facing surface. A second outlet channel releases air from the air mover into the seatback. A controller is configured to selectively activate the inlet channel. The controller is further configured to selectively and alternatively activate the first and second outlet channels.

Embodiments of the second aspect of the disclosure can include any one or a combination of the following features:
 the controller is configured to selectively activate the inlet channel, the air mover, and the first outlet channel; and
 an auxiliary inlet channel for moving air from a seatback bottom surface to the air mover, wherein the controller is configured to selectively and alternatively activate the inlet channel and the auxiliary inlet channel.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 3 is a cross-sectional view of a bezel and a vent according to an aspect of the present disclosure;

FIG. 3A is a cross-sectional view of a bezel and a vent according to an alternate aspect of the present disclosure;

FIG. 4 is a cross-sectional view of the bezel and the vent taken along line IV-IV of FIG. 3 according to an aspect of the present disclosure;

FIG. 4A is a cross-sectional view of the bezel and the vent taken along line IVA-IVA of FIG. 3A according to an alternate aspect of the present disclosure;

DETAILED DESCRIPTION OF THE PREFERRED EMBODIMENTS

Figure 1:
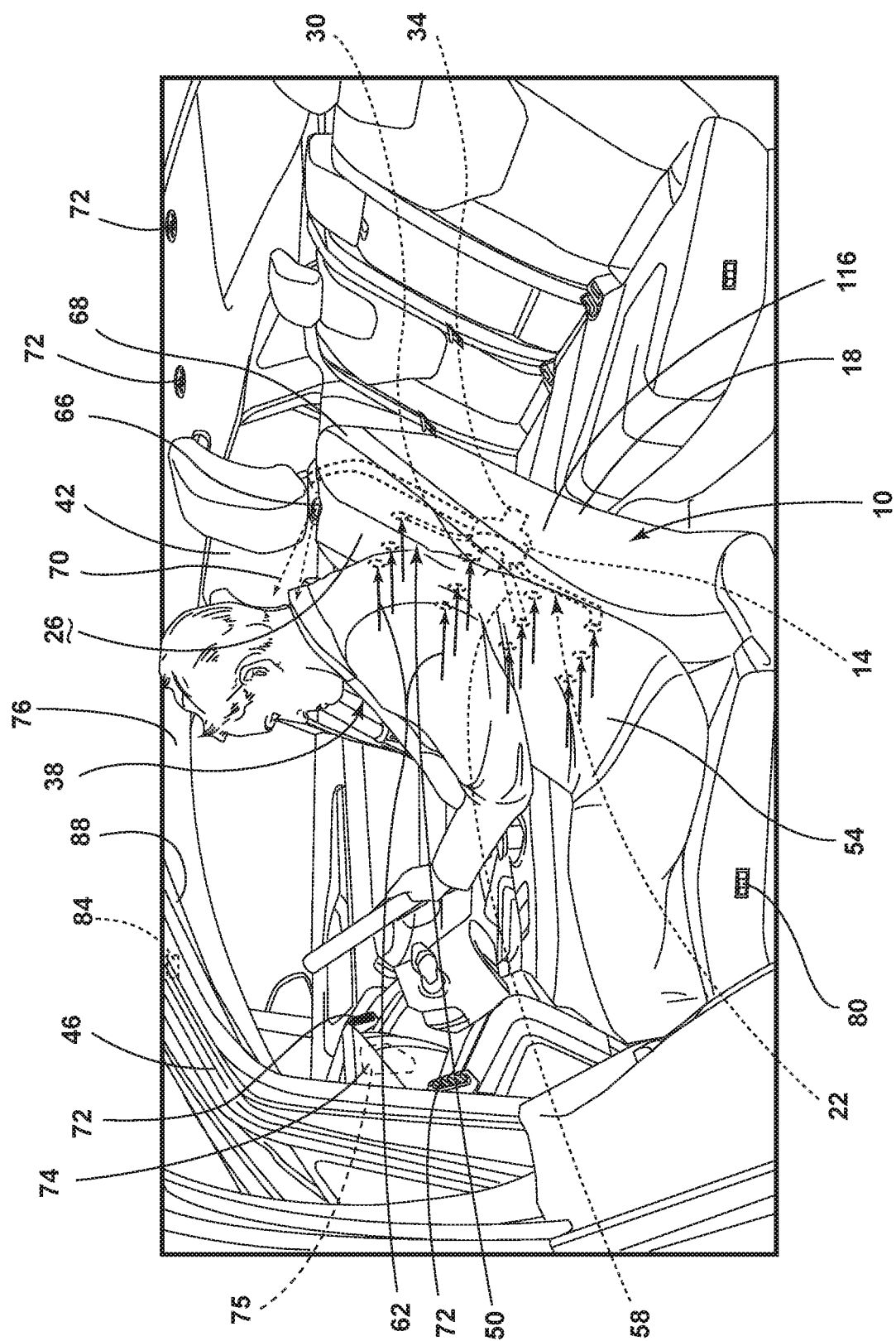
FIG. 1 is a side perspective view of an occupant environment with seating assemblies in a vehicle according to an aspect of the present disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-16, reference numeral 10 generally designates a vehicle seating assembly (seat) having an air mover 14 disposed within a seatback 18. The seating assembly 10 may also include an inlet channel 22 extending from an occupant supporting seatback surface (occupant surface) 26 to the air mover 14. The air mover 14 may include a first outlet channel 30 and a second outlet channel 34, and the air mover 14 may selectively and alternatively move air from the inlet channel 22 to one of the first outlet channel 30 or the second outlet channel 34.

With reference to FIG. 1, an occupant seating assembly 10 and a passenger seating assembly 38 may be disposed in a cabin 42 of a vehicle 46, such as a manually operated or autonomous vehicle. The occupant seating assembly 10 may include a ventilation system 50 to cool an occupant 54. In the example shown, the inlet channel 22 may include a plurality of tubes 58 that may extend from the occupant supporting seatback surface 26 (also referred to as the occupant supporting surface) to the air mover 14. In the aspect shown, the inlet channel 22 is shown as a plurality of tubes 58 that deliver air (arrows 62) from the occupant supporting seatback surface 26 to the air mover 14. The first outlet channel 30 may release air from the air mover 14 to a vent 66 disposed on an upper portion 68 of the seatback 18. As shown by arrows 70, air may be released from the vent 66 towards the occupant 54. Thus, the air entering the seat shown by arrows 62 may cool the back area of an occupant, and the air shown by arrows 70 leaving the vent 66 may cool the neck area of an occupant.

With continued reference to FIG. 1, in certain conditions, when temperature and atmospheric conditions are outside of a comfort range for the occupant 54, the seating assembly 10 may be uncomfortably warm, such that the seating assembly 10 may not provide the occupant 54 with comfortable transit in the vehicle 46. The occupant 54 may desire a cooling airflow shown by arrows 62 to flow from the occupant supporting seatback surface 26, through a seatback pad 116, and to the air mover 14. Similarly, in certain conditions, when temperature and atmospheric conditions are outside of a comfort range for a passenger, the passenger may be uncomfortably warm, such that the passenger may desire a cooling airflow shown by arrows 70 to flow from the vent 66 disposed on the upper portion 68 of the seating assembly 10 towards the neck of the occupant 54. In various aspects, the seat ventilation system 50 may route ambient air or conditioned air through the seating assembly 10.

With further reference to FIG. 1, a vehicle climate control system 75 may be disposed in the instrument panel 74. The vehicle climate control system 75 may release ambient air or conditioned air into the cabin 42 through vents 72 disposed in the instrument panel 74, ceiling 76, or other cabin areas. In certain conditions, vehicle occupants may desire more expedient comfort when they enter a vehicle. The climate control system 75 may be activated to provide comfort to occupants of the vehicle 46. Additionally, the seat ventilation system 50 may be activated to further comfort occupants.

The seat ventilation system 50 may be used in various vehicle such as automobiles, airplanes, trains, tractors, and other motorized vehicles.

The seat ventilation system 50 may provide comfort to an occupant of an autonomous vehicle 46. Some autonomous vehicles 46 may have relatively short predicted usage times (5-15 minutes) during which the cabin air should be constantly vented. Comfort may be difficult to maintain in the cabin 42 of an autonomous vehicle 46 when only the climate control system 75 is activated. Even when the climate control system 75 is activated, an occupant seated in a seating assembly 10 of an autonomous vehicle 46 may be too warm. Therefore, the cooling provided by the seat ventilation system 50, in addition to the ventilation and temperature control provided by the vehicle climate control system 75, may increase the comfort level of the occupant 54 of the autonomous vehicle 46.

The seat ventilation system 50 may be used independently of a climate control system 75. It is contemplated that the seat ventilation system 50 may be used when the climate control system 75 is not activated or not present in a vehicle.

Referring again to FIG. 1, it is to be understood that the seating assembly 10 with the seat ventilation system 50 may be located in any seating area of a vehicle 46. An occupant actuator 80, a sensor 84, or other input may activate the seat ventilation system 50. In the depicted aspect, the occupant actuator 80 may be near the occupant seating assembly 10. The sensor 84 may be located in a headliner 88 or other portion of the cabin 42.

Figure 2:
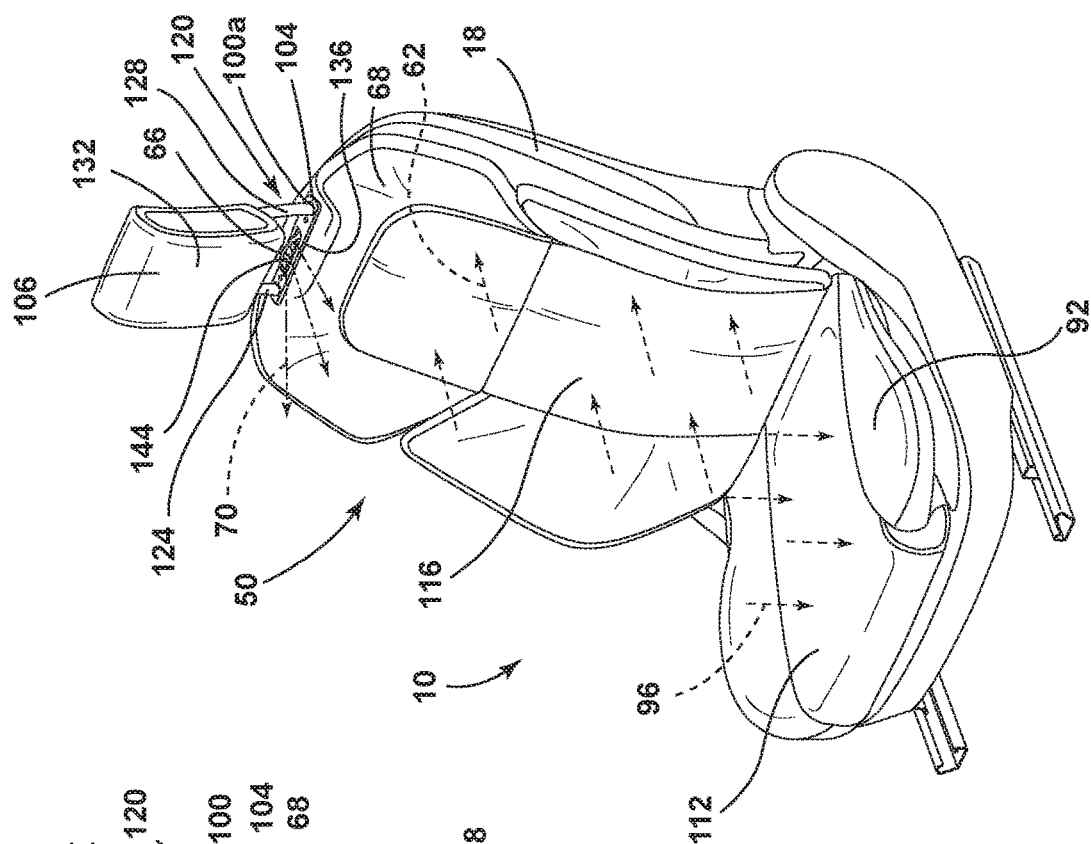
FIG. 2 is a side perspective view of a seating assembly with a vent disposed in a bezel according to an aspect of the present disclosure.
Figure 2A:
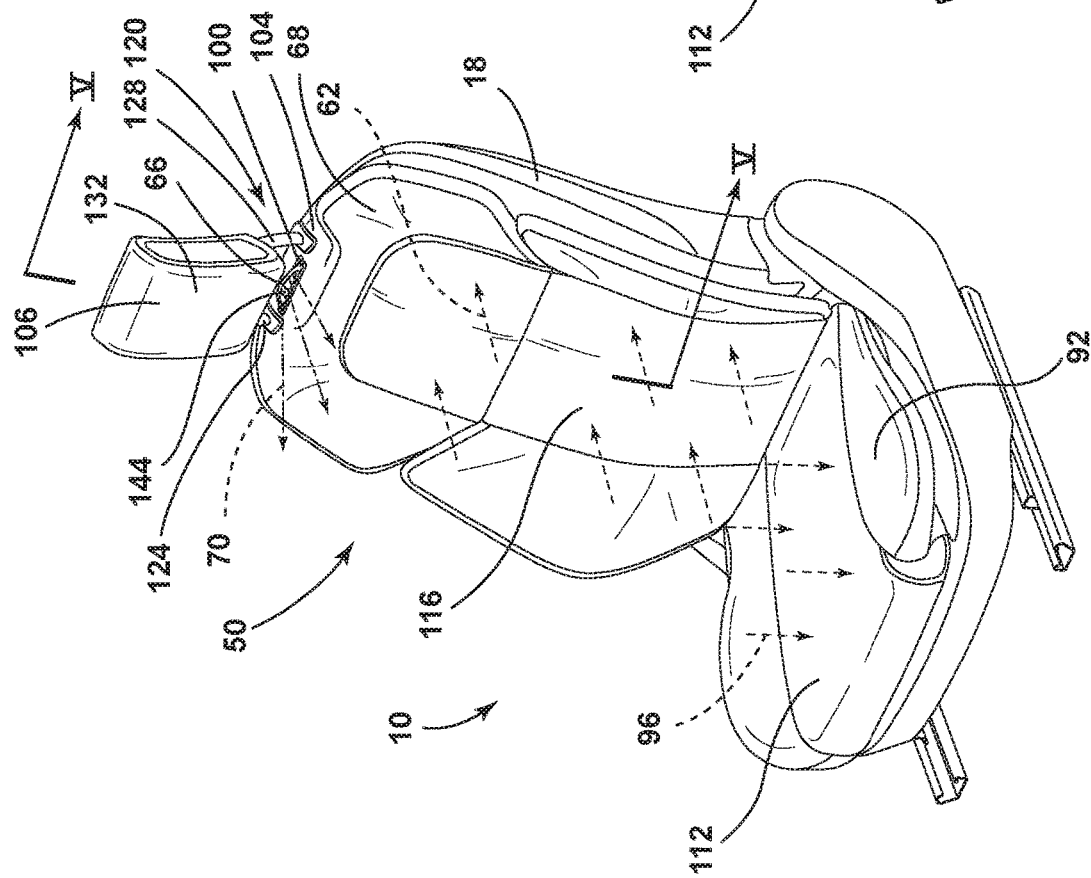
FIG. 2A is a side perspective view of an alternate aspect of the seating assembly of FIG. 2 with a vent and headrest rods disposed in a bezel according to an aspect of the present disclosure.

With reference to FIGS. 2 and 2A, the seat ventilation system 50 may include a bezel 100 or a bezel 100*a*. Bezels 100 and 100*a* house the vent 66 through which air (arrows 70) flows to cool the head, neck, and upper body of an occupant. Referring now to FIG. 2, a ventilation system 50 may provide cooling airflows into (arrows 62) and out of (arrows 70) the seating assembly 10. The seating assembly 10 may include a seat bottom 92 and a seatback 18. The seatback 18 may be pivotably coupled to the seat bottom 92. The seat bottom 92 may include a cushion 112, and the seatback 18 may include a pad 116. Air is shown entering the seatback 18 at arrows 62 and exiting the vent 66 at arrows 70. In various aspects, air may also enter a seat bottom 92, as shown by arrows 96, and air may exit the vent 66 at arrows 70.

With continued reference to FIG. 2, the vent 66 may be housed in a bezel 100. In the depicted aspect, the bezel 100 may be centrally disposed at a top surface 104 of an upper portion 68 of the seatback 18. In the depicted aspect, a headrest 106 may be coupled to the upper portion 68 of the seatback 18. The headrest 106 may be mounted on an extension member 120. The extension member 120 may include a first rod 124 and a second rod 128. The first rod 124 and the second rod 128 may support a bun 132. The extension member 120 may be vertically adjustable.

Referring now to FIG. 2A, an alternate aspect of the bezel 100 of FIG. 2 is shown. The alternate aspect of the bezel 100 is designated 100*a*. The bezel 100*a* in FIG. 2A may be designed to receive a headrest extension member 120 that extends through the bezel 100*a* and into the upper portion 68 of the seatback 18. The vent 66 may be disposed in a central portion 136 of the bezel 100*a* and between the first rod 124 and the second rod 128 of the headrest 106.

With reference to the vent 66 shown in FIGS. 2 and 2A, the vent 66 may be selectively positionable to direct air towards the occupant 54. The vent 66 may be selectively positioned through adjustment of the position of vertically disposed vanes 144 in the vent 66. Additionally, horizontally disposed vanes (not shown) for adjusting airflow may be located in the vent 66. As such, the seat ventilation system 50 may include a bezel 100 that may include a vent 66 or a bezel 100*a* that may include a vent 66 and that may receive first and second headrest rods 124, 128.

With reference to FIGS. 3-4A, additional views of the bezel 100 and the bezel 100*a* are shown. Referring to FIG. 3, a front view of the bezel 100 is shown. The bezel 100 may be elongated to fit along the top surface 104 of the seatback 18. The bezel 100 may include two holes 150 for receiving fasteners that mount the bezel 100 to a seatback frame or other support structure. The bezel 100 may include a rounded top dome portion 154 that directs the airflow shown by arrows 70 from the first outlet channel 30 to an occupant neck area. The bezel 100 may include a joint 151 to the first outlet channel 30. The joint 151 may include attachments to the first outlet channel 30. In the aspect shown, the bezel 100 includes a duct portion 152. The duct portion 152 includes barbs 153 or snap tabs that may protrude outward from the duct portion 152. The first inlet channel 30 includes recesses 155 for receiving the barbs 153 or snap tabs. The barbs 153 or snap tabs and the recesses 155 may form an interference fit that may secure the first inlet channel 30 to the duct portion 152 of the bezel 100. A seal 156 may be disposed between the first inlet channel 30 and the duct portion 152 of the bezel 100. The seal 156 may be made of a foam material. The seal 156 may insulate the space between the duct portion 152 of the bezel 100 and the first inlet channel 30 to minimize airflow into and out of the joint 151. The vanes 144 may be disposed in the vent 66. By manipulating the direction of airflow 70, the vent 66 can be used to provide air to various portions of the upper body of the occupant 54. This configuration can also account for occupants 54 of varying body types and body sizes.

Referring to FIG. 3A, an alternate aspect of bezel 100 is shown. The alternate aspect is designated 100*a*. Bezel 100*a* includes a vent 66 and first and second apertures 166, 170 for receiving first and second headrest rods 166, 170. The first and second apertures 166, 170 may be disposed at first and second ends 158, 162 of the bezel 100*a*.

With reference to FIG. 4, a cross-sectional view of the bezel 100 is shown taken along line IV-IV of FIG. 3. The holes 150 for fasteners are shown. The rounded top dome portion 154 of the bezel 100 for directing the airflow (arrows 70) out of the first outlet channel 30 is shown (FIG. 1).

With reference to FIG. 4A, a cross-sectional view of an alternate aspect of the bezel 100*a* is shown. The bezel 100*a* may include a first aperture 166 and a second aperture 170 for receiving the respective first rod 124 and second rod 128 of the headrest 106.

Figure 5:
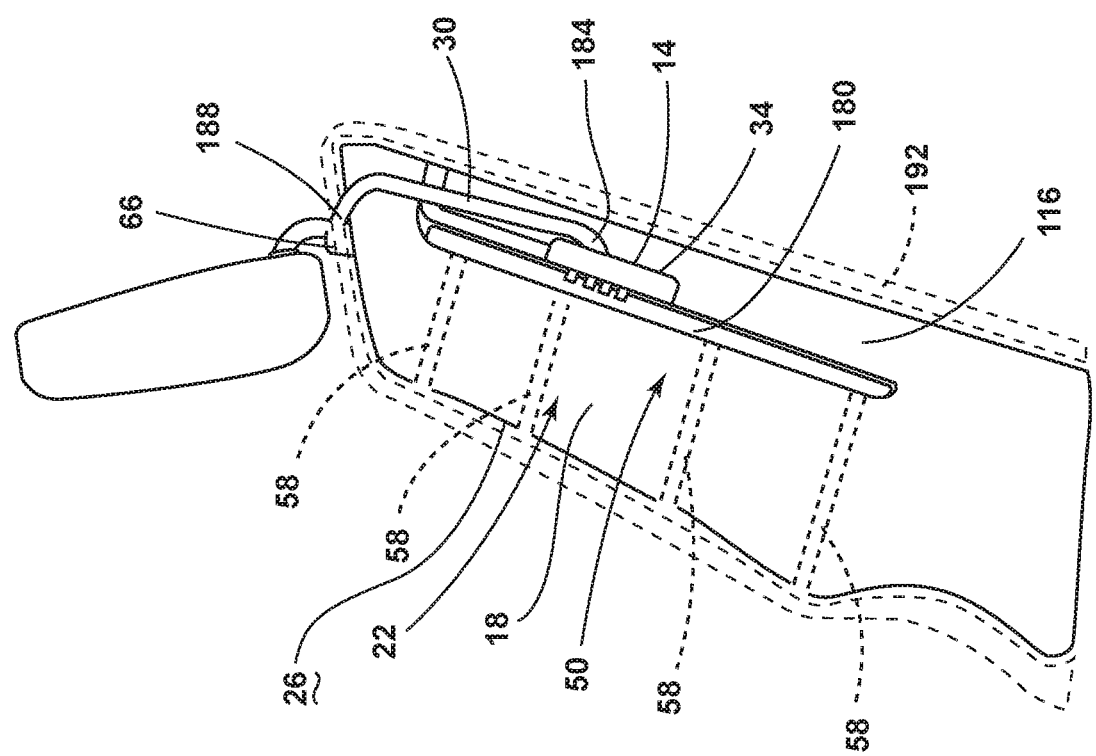
FIG. 5 is a cross-sectional view of a seatback taken along line V-V of FIG. 2 according to an aspect of the present disclosure.

While bezels 100, 100*a* may be disposed on the top surface 104 of the seatback 18, other aspects of the seat ventilation system 50 are disposed within the seatback 18. FIG. 5 shows a cross-sectional view of the seatback 18 of FIG. 2. In the depicted aspect, the inlet channel 22 is shown as a plurality of tubes 58 and a plenum 180. The plurality of tubes 58 may extend from the occupant supporting seatback surface 26 to the plenum 180 adjacent to the air mover 14. A first end 184 of the first outlet channel 30 may be coupled to the air mover 14. A second end 188 of the first outlet channel 30 may be coupled to the vent 66. The second outlet channel 34 may be disposed near the air mover 14. In various aspects of the disclosure, the seatback pad 116 may be a foam material, and the plurality of tubes 58 may be molded into the seatback pad 116. In various aspects, the plurality of tubes 58 in the seatback pad 116 may include separate plastic structures. A trim cover 192 may be shown disposed around the seatback 18. The trim cover 192 may include perforations that allow air to travel through the trim cover 192, the plurality of tubes 58, in the seatback pad 116, and the air mover 14 to cool the occupant 54. As such, the seat ventilation system 50 may be integrated in the seatback 18.

Figure 7:
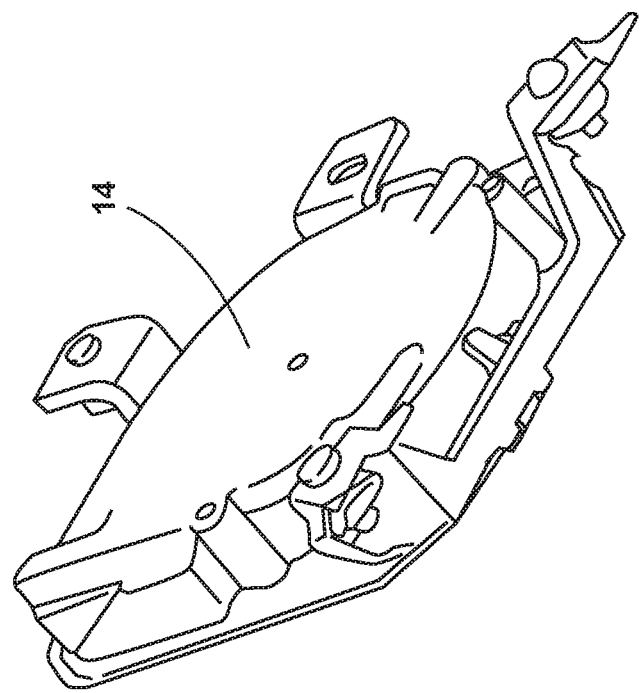
FIG. 7 is a rear perspective view of the air mover of FIG. 6.
Figure 6:
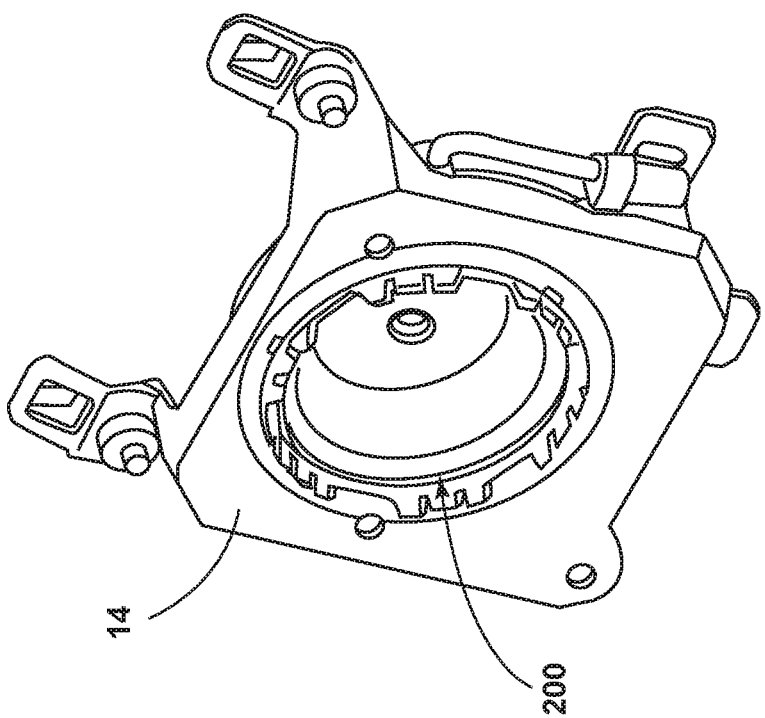
FIG. 6 is a front perspective view of an air mover according to an aspect of the present disclosure.
Figure 8:
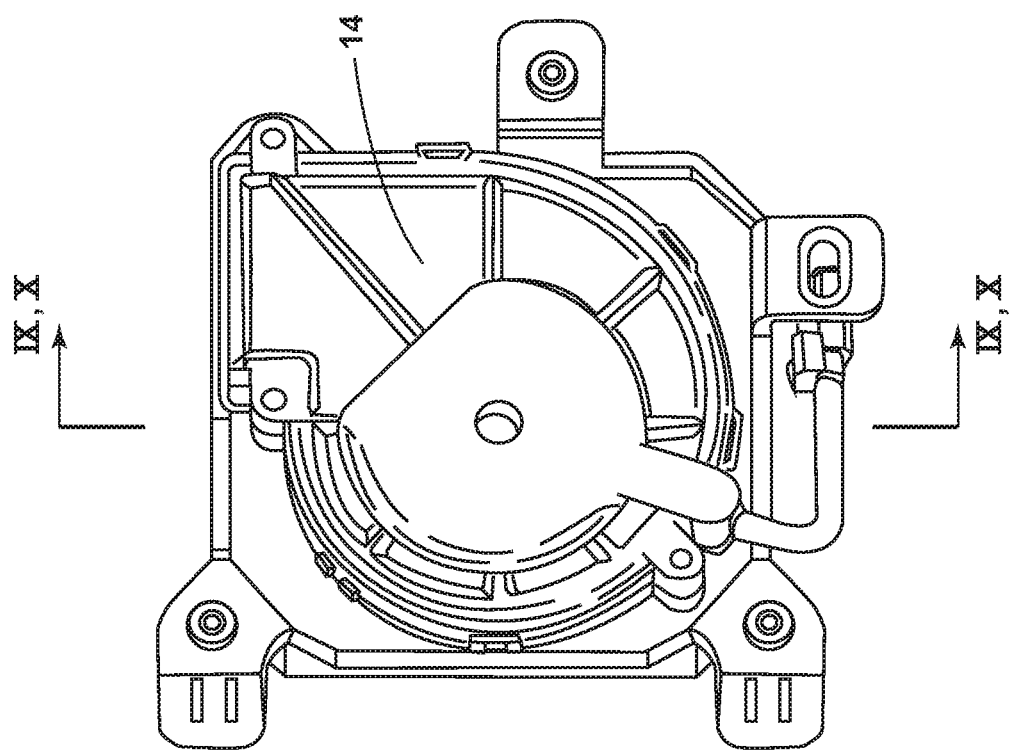
FIG. 8 is a plan view of the air mover of FIG. 6.

Seat ventilation system 50 may include an air mover 14 for selectively moving air through the seatback 18. Referring to FIGS. 6-10, various views of an air mover 14 are shown. In the depicted aspect, the air mover 14 may be a blower assembly. FIG. 6 is a front perspective view of the air mover 14. A front portion 200 of the air mover 14 may be arranged to face the occupant supporting seatback surface 26 within the seatback 18. In various aspects, the air mover 14 may be mounted to a frame or other supporting structure in the seatback 18. FIG. 7 is a back perspective view of the air mover 14. FIG. 8 is a back plan view of the air mover 14.

Figure 9:
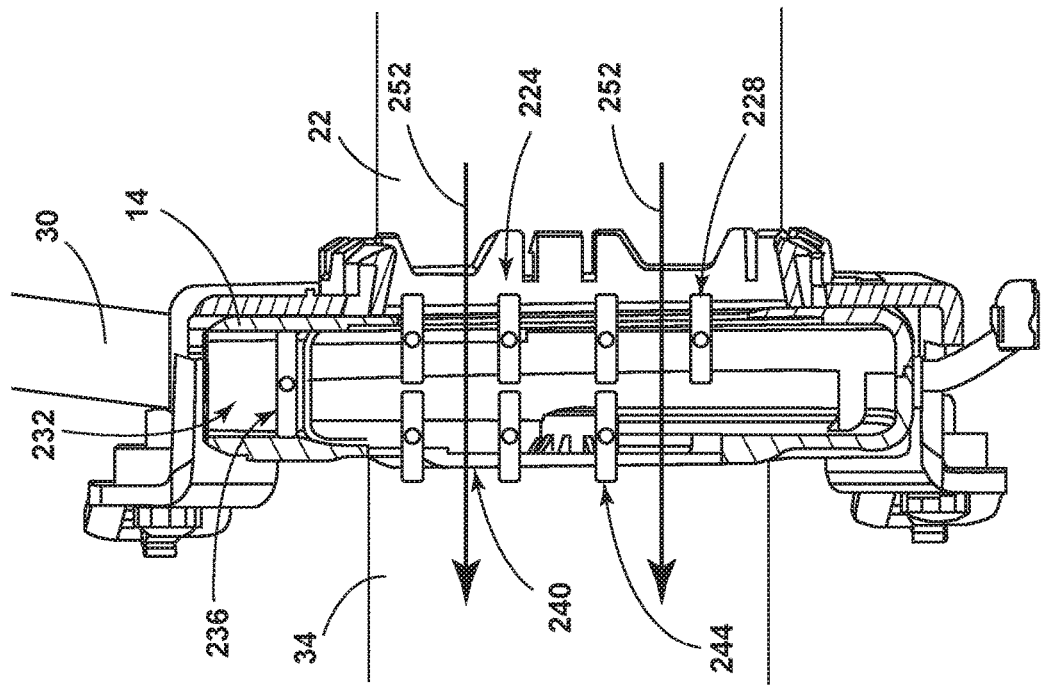
FIG. 9 is a cross-sectional view of the air mover of FIG. 8 taken along line IX-IX of FIG. 8 showing air entering an inlet channel and leaving a first outlet channel according to an aspect of the present disclosure.

FIG. 9 is a cross-sectional view of the air mover 14 taken along line IX-IX of FIG. 8. FIG. 9 illustrates an airflow direction (arrow 220) into the air mover 14 from the inlet channel 22 to the first outlet channel 30. In the depicted aspect, an inlet airflow adjuster 224 may include a butterfly valve 228. The inlet airflow adjuster 224 is shown in an open position. A first outlet airflow adjuster 232 may include a butterfly valve 236. The first outlet airflow adjuster 232 is shown in an open position. A second outlet airflow adjuster 240 may include a butterfly valve 244. The second outlet airflow adjuster 240 is shown in a closed position.

Figure 10:
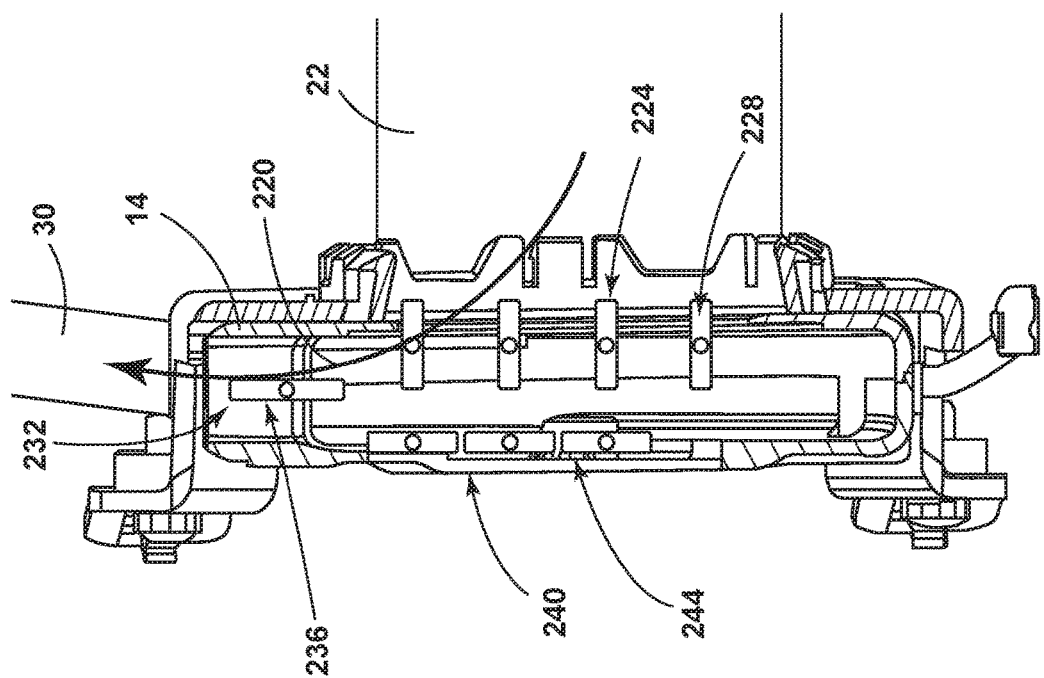
FIG. 10 is a cross-sectional view of the air mover of FIG. 8 taken along line X-X of FIG. 8 showing air entering an inlet channel and leaving a second outlet channel according to an aspect of the present disclosure.

FIG. 10 is a cross-sectional view of the air mover 14 taken along line X-X of FIG. 8. FIG. 10 illustrates airflow direction (arrows 252) into the air mover 14 from the inlet channel 22 to the second outlet channel 34. In the depicted aspect, the inlet airflow adjuster 224 and the second outlet airflow adjuster 240 are shown in open positions. The first outlet airflow adjuster 232 is shown in the closed position. In various aspects of the disclosure, the air mover 14 may have exhaust values within a range of from approximately 9.25 cubic feet per meter (CFM) to approximately 37.0 CFM. In various aspects, the air mover 14 exhaust value may be approximately 18.5 CFM. As such, the air mover 14 may be selectively activated to route air through various routes in the seatback 18.

Figure 11:
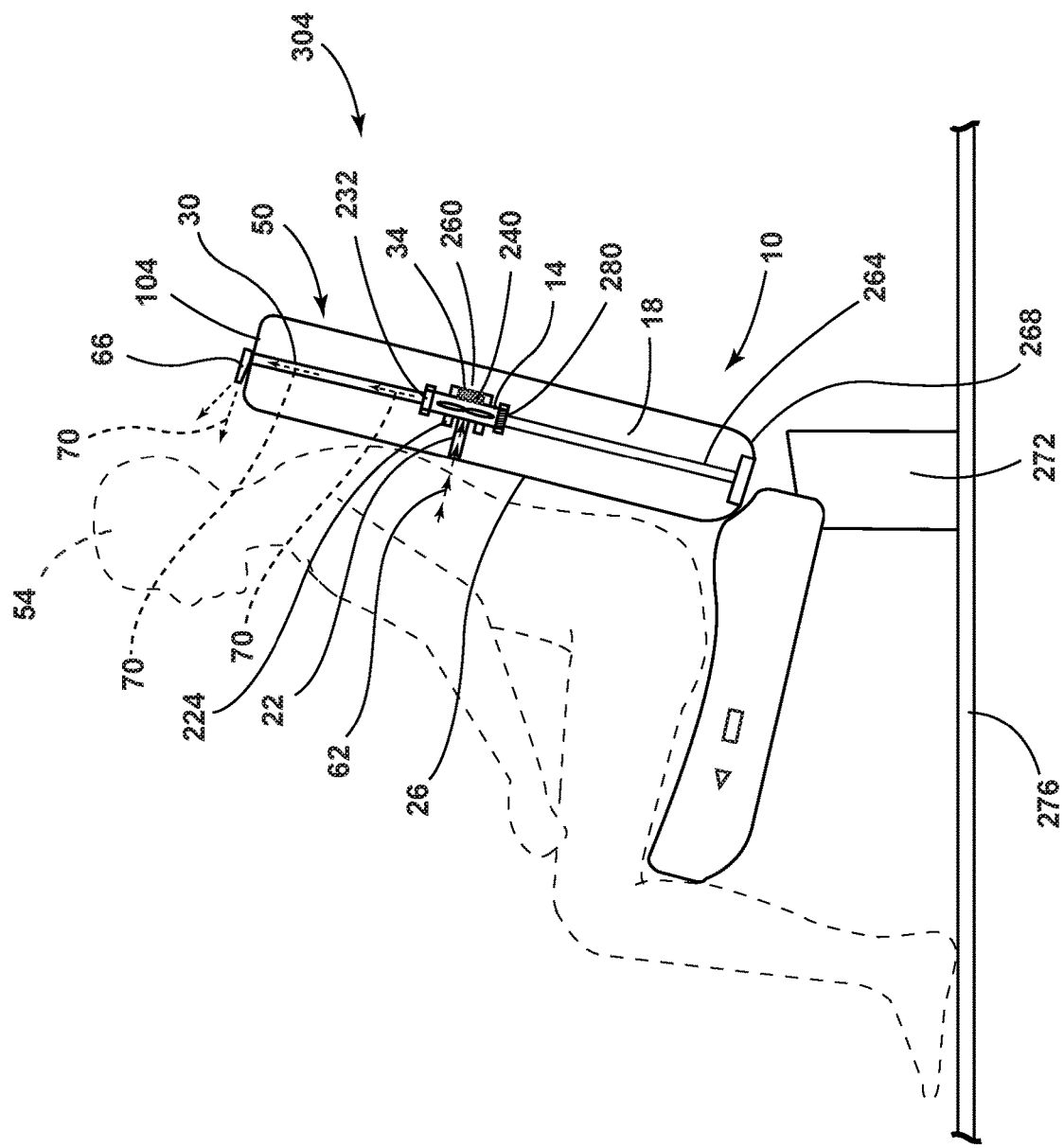
FIG. 11 is a seatback airflow schematic showing a first setting of a seat ventilation system with air entering an inlet channel, moving through the air mover, and leaving a first outlet channel according to an aspect of the present disclosure.
Figure 12:
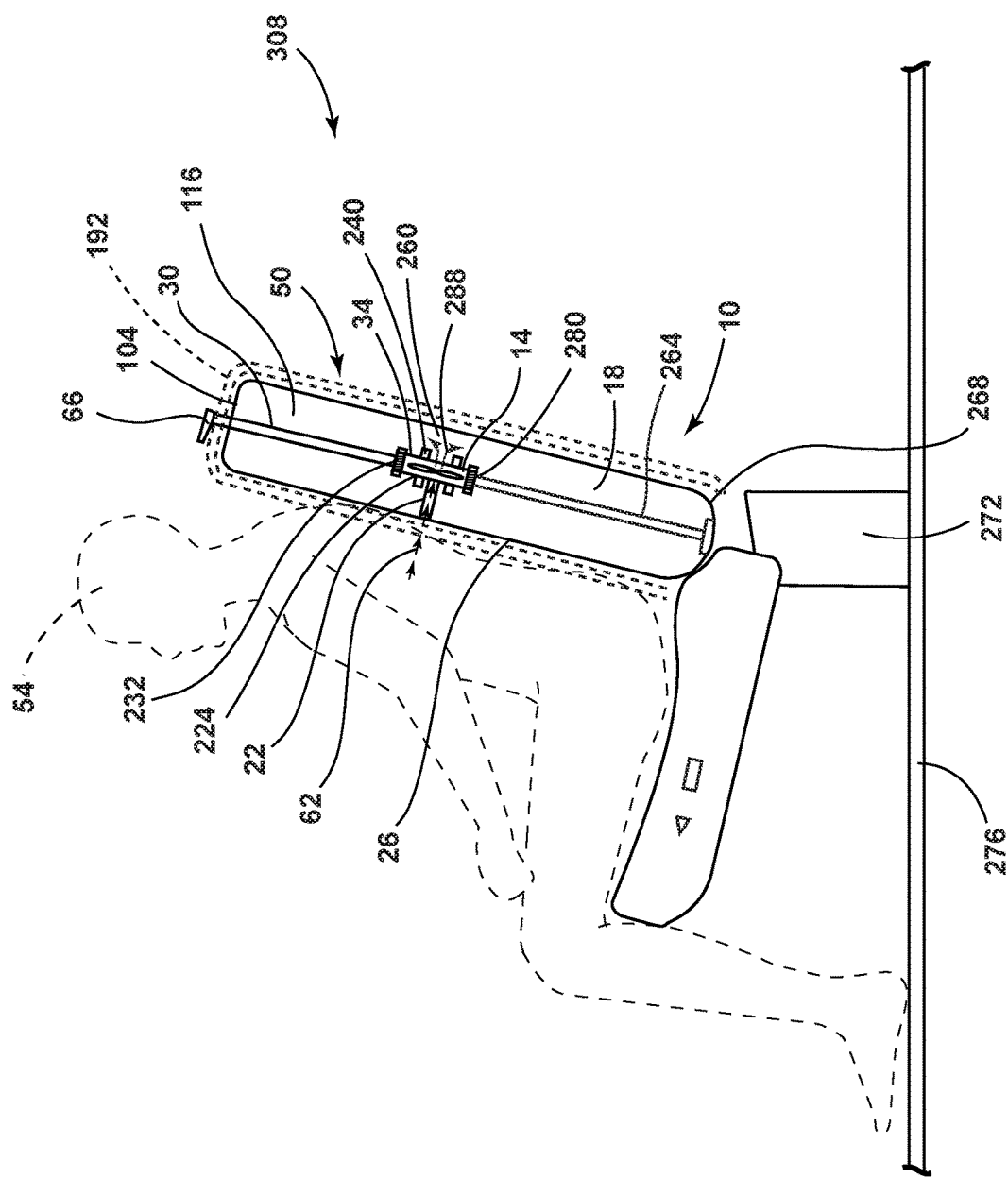
FIG. 12 is a seatback airflow schematic showing a second setting of a seat ventilation system with air entering an inlet channel, moving through the air mover, and leaving a second outlet channel according to an aspect of the present disclosure.
Figure 13:
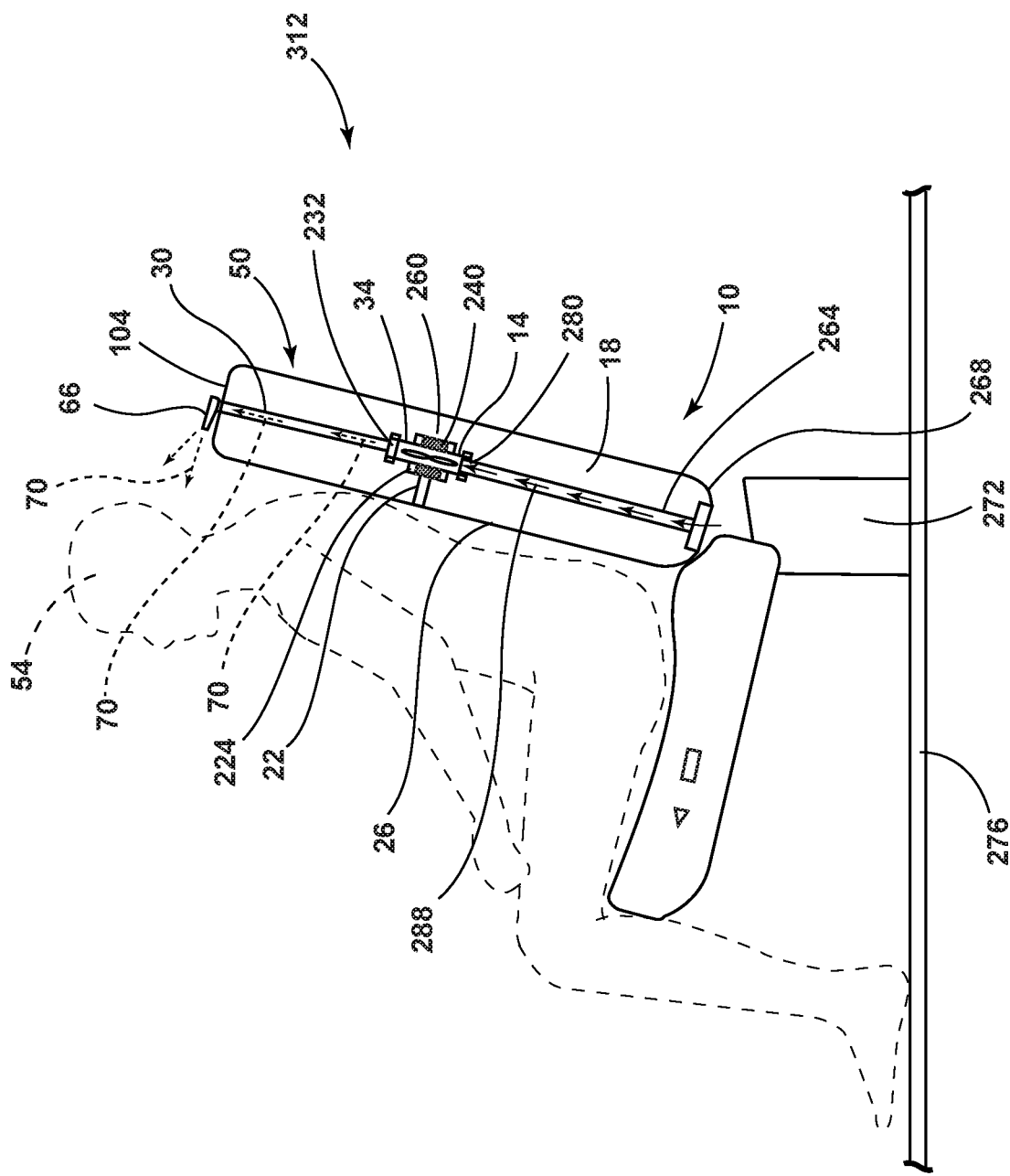
FIG. 13 is a seatback airflow schematic showing a third setting of a seat ventilation system with air entering an auxiliary inlet channel, moving through an air mover, and leaving a first outlet channel according to an aspect of the present disclosure.

With reference to FIGS. 11-16, schematic views of the seat ventilation system 50 (FIGS. 11-13), schematic views of the air mover 14 (FIGS. 14-15), and a block diagram of the vehicle seat ventilation system 50 (including the controller 300) show various settings of the seat ventilation system 50. Referring to FIGS. 11-13, schematic views of the seat ventilation system 50 in a first, a second, and a third setting are shown. The seating assembly 10 may include the seatback 18 having the occupant supporting seatback surface 26, a top surface 104, and a seatback interior 260. The air mover 14 may be disposed within the seatback 18. The seatback 18 may include the inlet channel 22 for moving air from the occupant supporting seatback surface 26 to the air mover 14, the first outlet channel 30 for moving air from the air mover 14 to the vent 66, and the second outlet channel 34 for releasing air from the air mover 14 into the seatback interior 260. An auxiliary inlet channel 264 is shown for moving air from the area proximate a seatback bottom 268 to the air mover 14. A base 272 may couple the seating assembly 10 to a floor 276. The optional auxiliary inlet channel 264 may be located anywhere in the seating assembly 10, and the optional auxiliary inlet channel 264 may be distal from the inlet channel 22.

FIG. 11 shows a schematic of a first setting 304 of the seat ventilation system 50. Air shown by arrows 70 may flow through the seatback 18 and out of the vent 66 when the occupant 54 may desire a cooling effect on the back and the neck. Air shown by arrows 62 may flow from the occupant supporting seatback surface 26, through the inlet channel 22, and into the air mover 14. Air shown by arrows 70 may flow out of the air mover 14, through the first outlet channel 30, and the vent 66. The second outlet airflow adjuster 240 is shown in the closed position. The auxiliary inlet airflow adjuster 280 is also shown in the closed position to prevent air from entering the air mover 14 from the auxiliary inlet channel 264. The inlet airflow adjuster 224 and the first outlet airflow adjuster 232 are shown in open positions.

FIG. 12 shows a schematic of a second setting 308 of the seat ventilation system 50. In the second setting 308, the occupant 54 may desire a cooling effect on only the back. Airflow shown by arrows 62 flows from the occupant supporting seatback surface 26 through the air mover 14. Airflow shown by arrows 288 may flow out of the second outlet channel 34 into the seatback interior 260. The air shown by arrows 288 may leave the seatback interior 260 through a variety of egress points of the seatback interior 260. By way of example, in various aspects of the disclosure, the seatback pad 116 may be porous, and the air depicted by arrows 288 may be expelled through the pores of the seatback pad 116. In various aspects, the air depicted by arrows 288 may travel out of the seatback 18 through gaps between the seatback pad 116 and a perforated trim cover 192. The first outlet airflow adjuster 232 is shown in the closed position to prevent air from leaving the vent 66. The auxiliary inlet airflow adjuster 280 is shown in the closed position to prevent air from entering the auxiliary inlet channel 264. The inlet airflow adjuster 224 and the second outlet airflow adjuster 240 are shown in open positions.

FIG. 13 shows a schematic of a third setting 312 of the seat ventilation system 50. The auxiliary inlet channel 264 is shown extending from the seatback bottom 268 to the air mover 14. In the third setting 312, the occupant 54 may not desire a cooling effect on the back, and the occupant 54 may desire a cooling effect on the neck. Airflow shown by arrows 288 may flow into an inlet port disposed at the seatback bottom 268. The airflow shown by arrows 288 may flow into the air mover 14 and out of the vent 66 to cool the neck area of the occupant 54. The inlet airflow adjuster 224 may prevent air from entering the air mover 14 from the inlet channel 22. The second outlet airflow adjuster 240 may be in the closed position to prevent air from leaving the second outlet channel 34. The auxiliary inlet airflow adjuster 280 and the first outlet airflow adjuster 232 may be in open positions.

Figure 15:
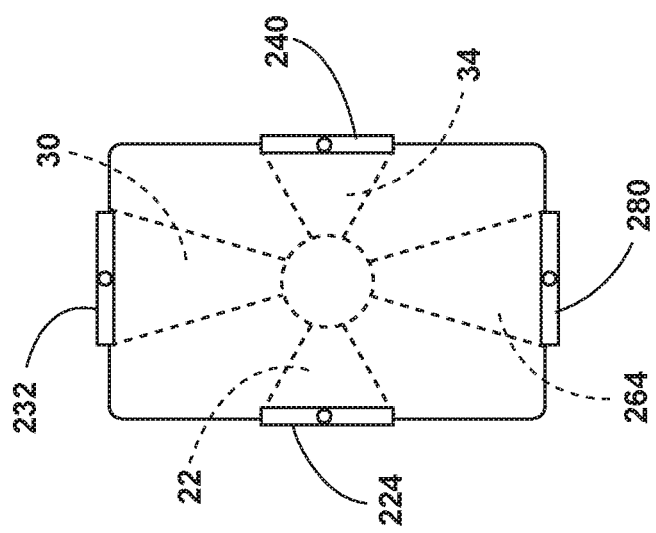
FIG. 15 is a schematic of the air mover of FIG. 14 showing an inlet airflow adjuster, a first outlet airflow adjuster, a second outlet airflow adjuster, and an auxiliary inlet airflow adjuster in closed positions according to an aspect of the present disclosure.
Figure 14:
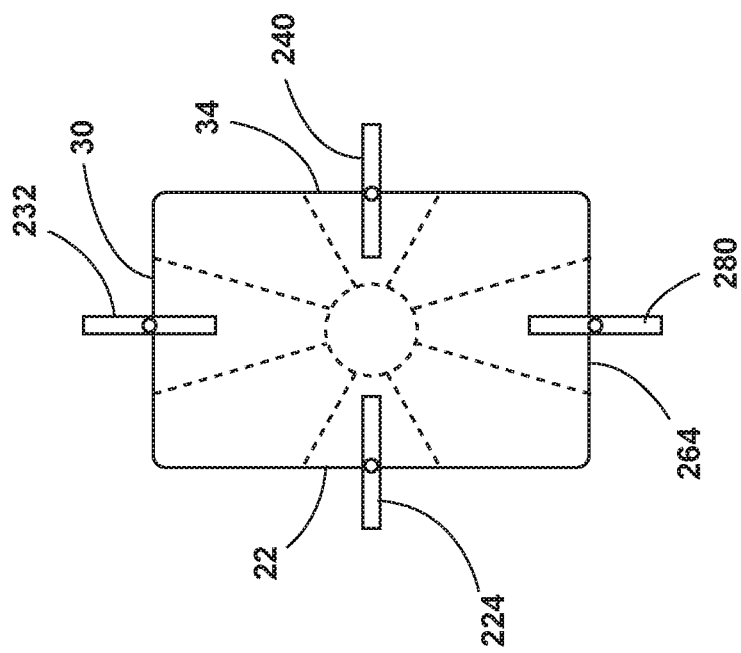
FIG. 14 is an air mover schematic showing an inlet airflow adjuster, a first outlet airflow adjuster, a second outlet airflow adjuster, and an auxiliary inlet airflow adjuster in open positions according to an aspect of the present disclosure.

Referring to FIGS. 14 and 15, schematic diagrams show the inlet airflow adjuster 224 and the auxiliary inlet airflow adjuster 280 in open (FIG. 14) and closed (FIG. 15) positions. The first and second outlet airflow adjusters 232, 240 are shown in open (FIG. 14) and closed (FIG. 15) positions. The inlet airflow adjuster 224 may be disposed at the inlet channel 22. The auxiliary inlet airflow adjuster 280 may be disposed at the auxiliary inlet channel 264. The first outlet airflow adjuster 232 may be disposed at the first outlet channel 30. The second outlet airflow adjuster 240 may be disposed at the second outlet channel 34. The inlet airflow adjuster 224 and the auxiliary inlet airflow adjuster 280 may be positionable in intermediary positions between open and closed positions. The first and second outlet airflow adjusters 232, 240 may be positionable in intermediary positions between open and closed positions.

Figure 16:
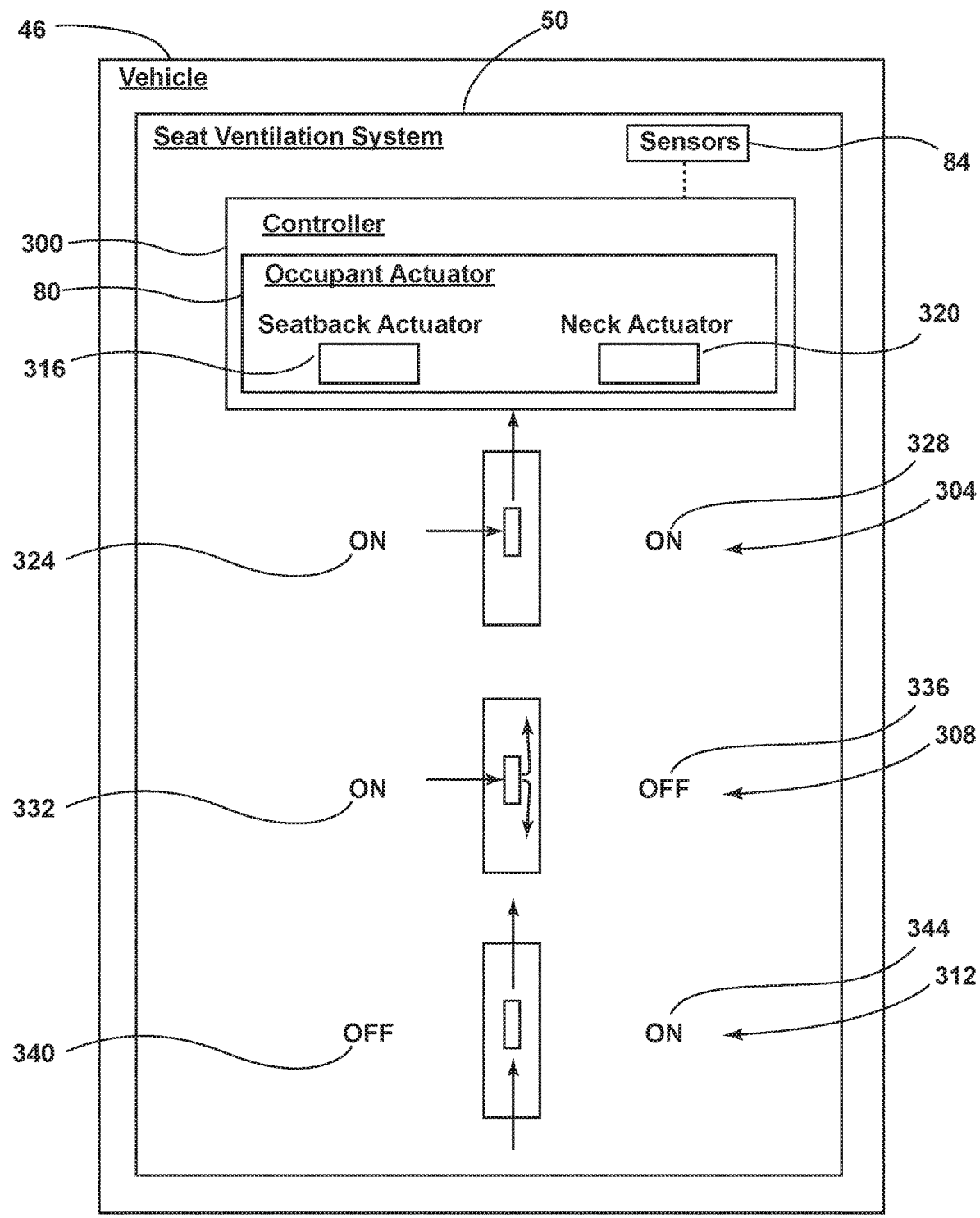
FIG. 16 is a schematic block diagram of the seat ventilation system in a first setting, a second setting, and a third setting according to an aspect of the present disclosure.

Referring now to FIG. 16, the seat ventilation system 50 may include a controller 300 for selectively activating the seat ventilation system 50 in a first setting 304, a second setting 308, and a third setting 312. A block diagram of the vehicle 46 is shown including the seat ventilation system 50. The occupant actuator 80 and the sensors 84 may provide inputs to a controller 300. The sensors 84 may detect conditions within the vehicle 46 (e.g., cabin temperature, presence of occupant, presence of passenger, occupant facial temperature, passenger facial temperature). In response to information received from the occupant actuator 80 and/or the sensors 84, the controller 300 may activate the seat ventilation system 50 in at least one of the first setting 304, the second setting 308, and the third setting 312. In various aspects, the occupant actuator 80 may include a seatback actuator 316 and a neck actuator 320.

Referring to FIGS. 11 and 16, in the first setting 304, air may flow from the occupant supporting seatback surface 26 to the air mover 14 and the seatback actuator 316 may be in an ON position 324. In the first setting 304, air may flow from the air mover 14 to the first outlet channel 30, and the neck actuator 320 may be in an ON position 328. Cooling of the back of the occupant 54 may have been activated with the seatback actuator 316 in the ON position 324. Cooling of the neck of the occupant 54 may have been activated with the neck actuator 320 in the ON position 328.

Referring to FIGS. 12 and 16, in the second setting 308, air may flow from the occupant supporting seatback surface 26 to the air mover 14, and the seatback actuator 316 may be in an ON position 332. In the second setting 308, air may flow from the air mover 14 to the second outlet channel 34, and the neck actuator 320 may be in an OFF position 336. Cooling of the back of the occupant 54 may have been activated with the seatback actuator 316 in the ON position 332. Cooling of the neck of the occupant 54 may not have been activated with the neck actuator 320 in the OFF position 336.

Referring to FIGS. 13 and 16, in the third setting 312, air may flow from the additional inlet channel 22 of the alternate aspect to the air mover 14, and the seatback actuator 316 may be in an OFF position 340. In the third setting 312, air may flow from the air mover 14 to the first outlet channel 30, and the neck actuator 320 may be in an ON position 344. Cooling of the seatback 18 of the occupant 54 may not have been activated with the seatback actuator 316 in the OFF position 340. Cooling of the neck of the occupant 54 may have been activated with the neck actuator 320 in the ON position 344. As such, the controller 300 may be configured to activate the seat ventilation system 50 in various settings.

In various aspects of the disclosure, the seat ventilation system 50 may be located in any seat in the vehicle. In various aspects of the disclosure, the inlet channel, the auxiliary inlet channel, the first outlet channel, and the second outlet channel may extend from the air mover to various seatback surfaces. In various aspects of the disclosure, additional inlet channels may be added to the seat ventilation system. In various aspects of the disclosure, additional outlet channels may be added to the seat ventilation system.

In various aspects of the disclosure, the vanes of the vent may be arranged to block airflow out of the vent. In various aspects of the disclosure, the vanes may be closed, the first outlet air adjuster may be in an open position, and the second outlet adjuster may be configured to allow release of air into the seatback interior. As such, airflow out of the vent may be blocked.

A variety of advantages may be derived from use of the present disclosure. Neck comfort may be improved for relatively minor costs by adding ducting and a grill to an existing seatback having a blower with exhaust. The seat ventilation system may be used to achieve environmentally sound vehicle conditions that minimize the use of power. An optional door shutoff for the grill on the vent allows for selection of passive or directional airflow from the vent to the occupant.

It is to be understood that variations and modifications can be made on the afore-mentioned structure without departing from the concepts of the present disclosure, and further it is to be understood that such concepts are intended to be covered by the following claims unless these claims by their language expressly state otherwise.

What is claimed is:

1. A vehicle seat comprising:
   an air mover within a seatback; and
   an inlet channel extending from an occupant seatback surface to the air mover and having first and second outlet channels, wherein the air mover selectively and alternatively moves air from the inlet channel to one of the first and second outlet channels, wherein the first outlet channel includes a vent located proximate a headrest, wherein the vent is centrally disposed on the top of the seatback and between the top of the seatback and the headrest, wherein the first outlet channel extends from the air mover to the vent, wherein the first outlet channel is selectively operable to exhaust air to the vent, and wherein the second outlet channel is selectively operable to exhaust air into a seatback interior, and further comprising:
   a first outlet airflow adjuster for selectively blocking airflow from the air mover to the first outlet channel; and
   a second outlet airflow adjuster for selectively blocking airflow from the air mover to the second outlet channel.

2. The vehicle seat of claim 1, wherein the first outlet channel is centrally disposed in the seatback.

3. The vehicle seat of claim 2, further comprising:
   a bezel disposed in the top of the seatback, wherein the bezel houses the vent.

4. The vehicle seat of claim 3, wherein the bezel comprises one or more apertures for receiving the headrest.

5. The vehicle seat of claim 4, wherein the one or more apertures comprise first and second apertures disposed on respective first and second sides of the vent.

6. The vehicle seat of claim 3, wherein the vent is selectively positionable in an open position, a closed position, and a plurality of positions between the open position and the closed position.

7. The vehicle seat of claim 6, wherein the inlet channel comprises a plurality of tubes extending from the occupant seatback surface to the air mover.

8. The vehicle seat of claim 1, further comprising an auxiliary inlet channel, wherein the auxiliary inlet channel extends from a seatback bottom portion to the air mover, and wherein the inlet channel and the auxiliary inlet channel are selectively and alternatively operable to deliver air to the air mover.

9. A ventilation system for a vehicle seat, comprising:
   a vent retained in a bezel;
   an inlet channel for delivering air from a seating surface to an air mover;
   a first outlet channel for delivering air from the air mover to the vent;
   a second outlet channel for delivering air from the air mover to a seatback interior, wherein the bezel is centrally disposed at a top of a seatback; and
   a headrest, wherein the headrest is attached to the seatback, wherein the bezel is disposed between an upper portion of the seatback and the headrest, and wherein the headrest comprises an extension member that extends through the bezel and into the upper portion of the seatback.

10. The ventilation system for a vehicle seat claim 9, wherein the extension member comprises a first rod and a second rod.

11. The ventilation system for a vehicle seat of claim 10, wherein the vent is selectively positionable to direct air towards at least one of an occupant facing portion of the seatback and an occupant facing portion of the headrest.

12. The ventilation system for a vehicle seat of claim 9, wherein the extension member comprises a first rod and a second rod and wherein the vent is disposed between the first rod and the second rod.

13. A ventilation system for a vehicle seating assembly comprising:
- a seatback comprising:
  - an occupant supporting surface;
  - an upward facing surface;
  - a bezel disposed on the upward facing surface; and
  - an air mover;
- an inlet channel for moving air from the occupant supporting surface to the air mover;
- a first outlet channel for moving air from the air mover to a vent coupled with a bezel;
- a second outlet channel for releasing air from the air mover into the seatback; and
- a controller configured to selectively activate the inlet channel, wherein the controller is further configured to selectively and alternatively activate the first and second outlet channels.

14. The ventilation system for a vehicle seating assembly of claim 13, wherein the controller is configured to selectively activate the inlet channel, the air mover, and the first outlet channel.

15. The ventilation system for a vehicle seating assembly of claim 13, further comprising:
- an auxiliary inlet channel for moving air from a seatback bottom surface to the air mover, wherein the controller is configured to selectively and alternatively activate the inlet channel and the auxiliary inlet channel.

16. The ventilation system for a vehicle seating assembly of claim 13, wherein the bezel is coupled to the first outlet channel with an interference fit.

17. The ventilation system for a vehicle seating assembly of claim 13, wherein the bezel is elongated to fit along the upward facing surface of the seatback.

18. The ventilation system for a vehicle seating assembly of claim 13, wherein the bezel includes a dome portion.

19. The ventilation system for a vehicle seating assembly of claim 13, wherein the bezel includes a duct portion coupled to the first outlet channel.

20. The ventilation system for a vehicle seating assembly of claim 19, further comprising:
- a seal disposed between the duct portion and the first outlet channel.

* * * * *